(12) United States Patent
Briggs et al.

(10) Patent No.: US 10,607,221 B2
(45) Date of Patent: *Mar. 31, 2020

(54) SECURE PASSCODE ENTRY USING MOBILE DEVICE WITH AUGMENTED REALITY CAPABILITY

(71) Applicant: International Business Machines Corporation, Armonk, NY (US)

(72) Inventors: Simon A. S. Briggs, Hursley (GB); James K. Hook, Hursley (GB); Hamish C. Hunt, Hursley (GB); Nicholas K. Lincoln, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,088

(22) Filed: Jul. 25, 2018

(65) Prior Publication Data

US 2018/0330376 A1    Nov. 15, 2018

Related U.S. Application Data

(63) Continuation of application No. 14/887,861, filed on Oct. 20, 2015, now Pat. No. 10,049,358.

(30) Foreign Application Priority Data

Oct. 29, 2014    (GB) .................................. 1419252.0

(51) Int. Cl.
*G06F 21/00* (2013.01)
*G06Q 20/40* (2012.01)
(Continued)

(52) U.S. Cl.
CPC ......... *G06Q 20/4012* (2013.01); *G06F 21/00* (2013.01); *G06F 21/31* (2013.01); *G06Q 20/3223* (2013.01); *G06Q 2220/00* (2013.01)

(58) Field of Classification Search
None
See application file for complete search history.

(56) References Cited

U.S. PATENT DOCUMENTS

| 8,438,110 B2 | 5/2013 | Calman et al. |
| 2011/0113245 A1 | 5/2011 | Varadarajan |

(Continued)

FOREIGN PATENT DOCUMENTS

| CN | 102866506 | 1/2013 |
| EP | 2693255 | 2/2014 |
| WO | WO2013116901 | 8/2013 |

OTHER PUBLICATIONS

Forte A.G., Garay J.A., Jim T., Vahlis Y. (2014) EyeDecrypt—Private Interactions in Plain Sight. In: Abdalla M., De Prisco R. (eds) Security and Cryptography for Networks. SCN 2014. Lecture Notes in Computer Science, vol. 8642. Springer, Cham, Sep. 3-5, 2014 (Year: 2014).*

(Continued)

*Primary Examiner* — Alexander Lagor
(74) *Attorney, Agent, or Firm* — Heslin Rothenberg Farley & Mesiti P.C.; Alexander Jochym, Esq.

(57) ABSTRACT

Secure passcode entry using a mobile device having augmented reality capability. The mobile device is registered with an authorization server to register an agreed input display algorithm with an initialization seed, and a user passcode is registered with the authorization server. A superset of options is obtained from an input interface device at which a user passcode is to be entered. The superset of options is processed using the input display algorithm and initialization seed to result in an arrangement of characters including the characters of a registered user passcode. The arrangement of characters is overlaid using the augmented (Continued)

reality capability of the mobile device in relation to an input interface of the input interface device.

20 Claims, 9 Drawing Sheets

(51) Int. Cl.
  *G06F 21/31* (2013.01)
  *G06Q 20/32* (2012.01)

(56) References Cited

U.S. PATENT DOCUMENTS

| 2013/0159196 A1 | 6/2013 | DiZoglio |
| 2013/0288647 A1 | 10/2013 | Turgeman |
| 2014/0143037 A1 | 5/2014 | Zhou et al. |
| 2016/0125411 A1 | 5/2016 | Briggs et al. |

OTHER PUBLICATIONS

Search Report for GB1419252.0 dated Apr. 30, 2015, pp. 1-3.
Anonymous, "Concept for Matrix-based Passwords that are Safe Against Observation," IP.com No. 000206725, May 4, 2011, pp. 1-6.
Forte et al., EyeDecrypt—Private Interactions in Plain Sight. In: Abdalla M. De Prisco R. (eds) Security and Cyptography for Networks. SCN 2014. Lecture Notes in Computer Science, vol. 8642, Springer, Cham, Sep. 3-5, 2014.
Roesner et al., "Security and Privacy for Augmented Reality Systems," Dec. 20, 2013, pp. 1-10.

\* cited by examiner

SECURE PASSCODE ENTRY USING MOBILE DEVICE WITH AUGMENTED REALITY CAPABILITY

PRIOR FOREIGN APPLICATION

This application claims priority from United Kingdom (GB) patent application number 1419252.0, filed Oct. 29, 2014, which is hereby incorporated herein by reference in its entirety.

BACKGROUND

One or more aspects relate to the field of secure passcode entry using a mobile device with augmented reality capability. In particular, one or more aspects relate to secure passcode entry using a mobile device for entering the passcode at a terminal.

Wearable devices in the form of headsets, for example, Google Glass (Google and Google Glass are trademarks of Google, Inc.) are known which enable an augmented reality (AR) display. Mobile phone devices with a camera may also be used as an augmented reality device by overlaying an augmented reality display on the screen of the mobile phone device.

In AR pin code security, a PIN entry device is needed to be specifically paired with the AR capable device. This may use a traditional pairing by exchanging some information or holding down a button; however, this is cumbersome for the user.

Current solutions for pairing involve making one device discoverable, selecting that device on the other, and then checking that the confirmation codes match to make sure there is not someone else trying to interfere with the pairing. This is quite good for security if users check the codes carefully. In practice, the inconvenience of checking the codes prevents people from checking and reduces the security. This can be a significant problem in a financial situation where there could be big rewards for attackers.

PIN authentication using AR devices is known in which a random or blank keypad is displayed to a user for entry of a PIN. Due to the pairing of the AR device with a host device of the keypad, the AR device and the host device know the keypad arrangement without this being displayed.

However, there remain security concerns due to the possible interception of data transfer between the host device and the AR device. Also, existing methods require a wireless data transfer communication during the PIN authentication which limits the applicability of such arrangements.

SUMMARY

An improved method of secure passcode entry, especially for cash points and chip and pin devices.

Shortcomings of the prior art are overcome and additional advantages are provided through the provision of a computer-implemented method of secure passcode entry using a mobile device having augmented reality capability. The method includes registering the mobile device with an authorization server to register an agreed input display algorithm with an initialization seed and wherein a user passcode is registered with the authorization server; obtaining a superset of options from an input interface device at which the user passcode is to be entered; processing the superset of options using the input display algorithm and initialization seed to result in an arrangement of characters including characters of the registered user passcode; and overlaying the arrangement of characters using the augmented reality capability of the mobile device in relation to an input interface of the input interface device.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

DETAILED DESCRIPTION

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure aspects of the present invention.

A method and system are provided for secure passcode entry using a mobile device. At the point of passcode entry, the user mobile device having augmented reality (AR) capability is supplied with a superset of options, far in excess of the number of options that the input device is capable of supporting. These options are filtered and merged, then overlaid on the input device using the AR capability. Such an implementation does not require a wireless link with the input interface device.

Figure 1:
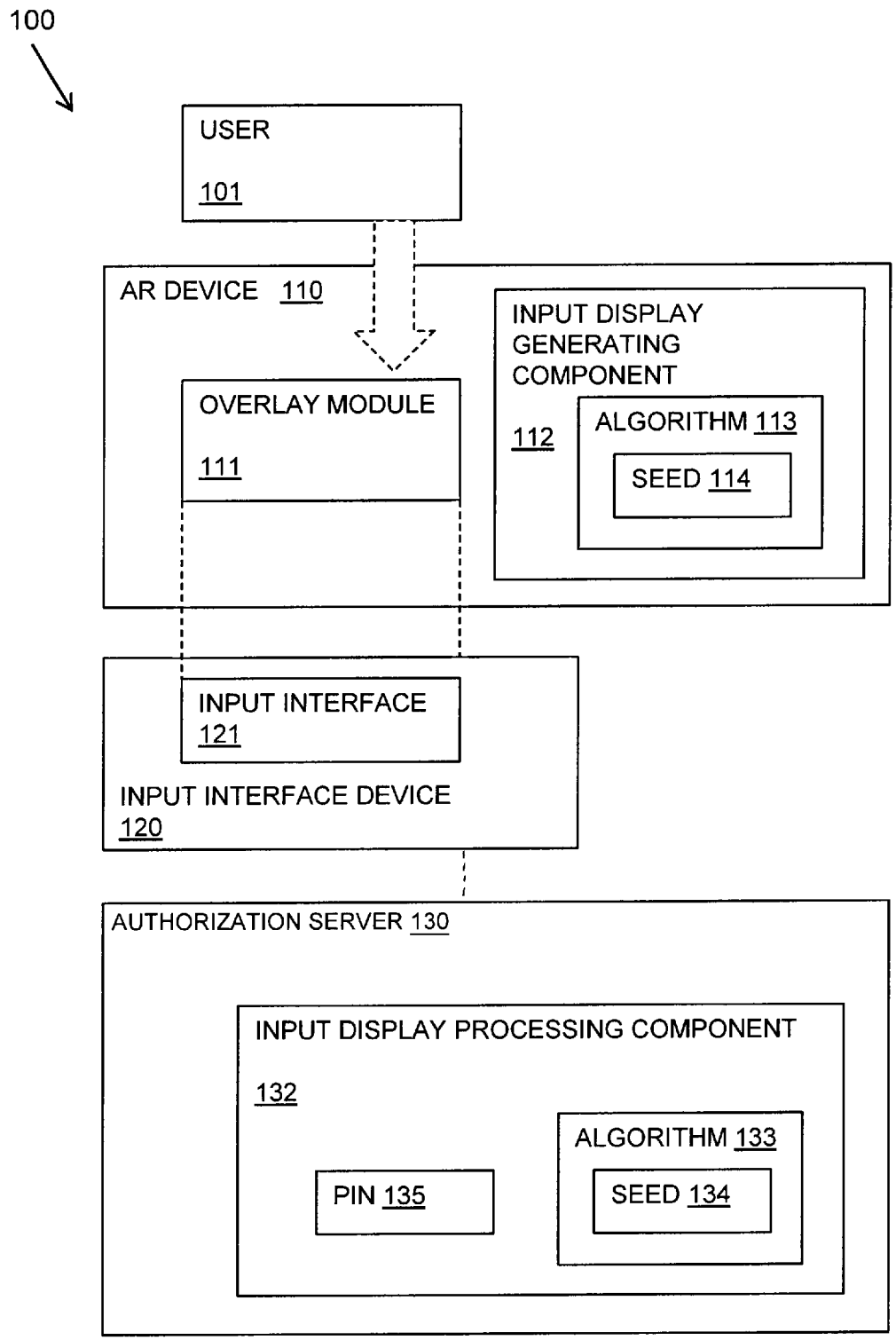
FIG. 1 is a schematic diagram of an example embodiment of a system in accordance with an aspect of the present invention.

Referring to FIG. 1, a schematic diagram 100 illustrates one example of the described system.

A user 101 has an AR device 110 in the form of a mobile device that may analyze acquired images of the environment and overlay information using an overlay module 111 to provide the information in the perspective of the user, superimposed on designated locations. The AR device 110 may be in the form of a wearable device, such as glasses having AR capabilities, or may be a mobile phone device having a camera providing an AR capability, or may be another form of device which can provide AR processing and overlay displayable to the user 101.

An input interface device 120 may be provided for receiving an input from the user 101 entered into an input interface 121. The input interface device 120 may be, for example, a point of sale (POS) device, an automatic teller machine (ATM), or other device having an input capability for receiving a passcode or PIN. For example, in modern payment transactions, a POS may be a merchant's mobile phone device and a PIN may be required to be entered onto a touch screen of the mobile phone device in order to confirm a payment.

It is assumed that the user 101 has a passcode, for example, a personal identification number (PIN) or password, known only to themselves and the authorizing entity of their transaction. The term PIN is used in this description and may be a numerical PIN or an alphanumerical PIN.

The input interface device 120 may be linked to an authorization server 130 of the authorizing entity which may control access to transactions once a passcode or PIN has been entered via the input interface device 120 and verified by the authorization server 130 against a registered passcode or PIN 135 of the user. The authorization server 130 may be local to or remote from the input interface device 120 and may communicate with the input interface device 120 via a network or other form of communication connection.

The AR device 110 is paired in a secure manner as a one off-instance with the authorizing server 130 for an input interface device 120. During this pairing, an algorithm 113, 133 is initialized with a unique seed 114, 134 for the user, such that this algorithm may be used to uniquely specify:

A required subset from a superset of options.
An optional merging of subset items to form compound selections.

The form of the subset selection and merging may take many different forms and examples are given below.

This unique processing is known by the AR device 110 and the authorizing server 130 for the transaction only. This algorithm may be static, in that the same subset and pairings are made upon each use, or dynamic in that different subsets and pairings are created at each interaction instance.

The AR device 110 may include an input display generating component 112 and the authorization server 130 may include a corresponding input display processing component 132. The input display generating component 112 of the AR device 110 may generate an input display as overlaid by the overlay module 111 based on the algorithm 113 and the seed value 114.

The input display processing component 132 or the authorization server 130 may generate a corresponding input display using the algorithm 133 and seed value 134 in order to determine the input made by the user of the AR device 110 into the input interface device 120.

Figure 2:
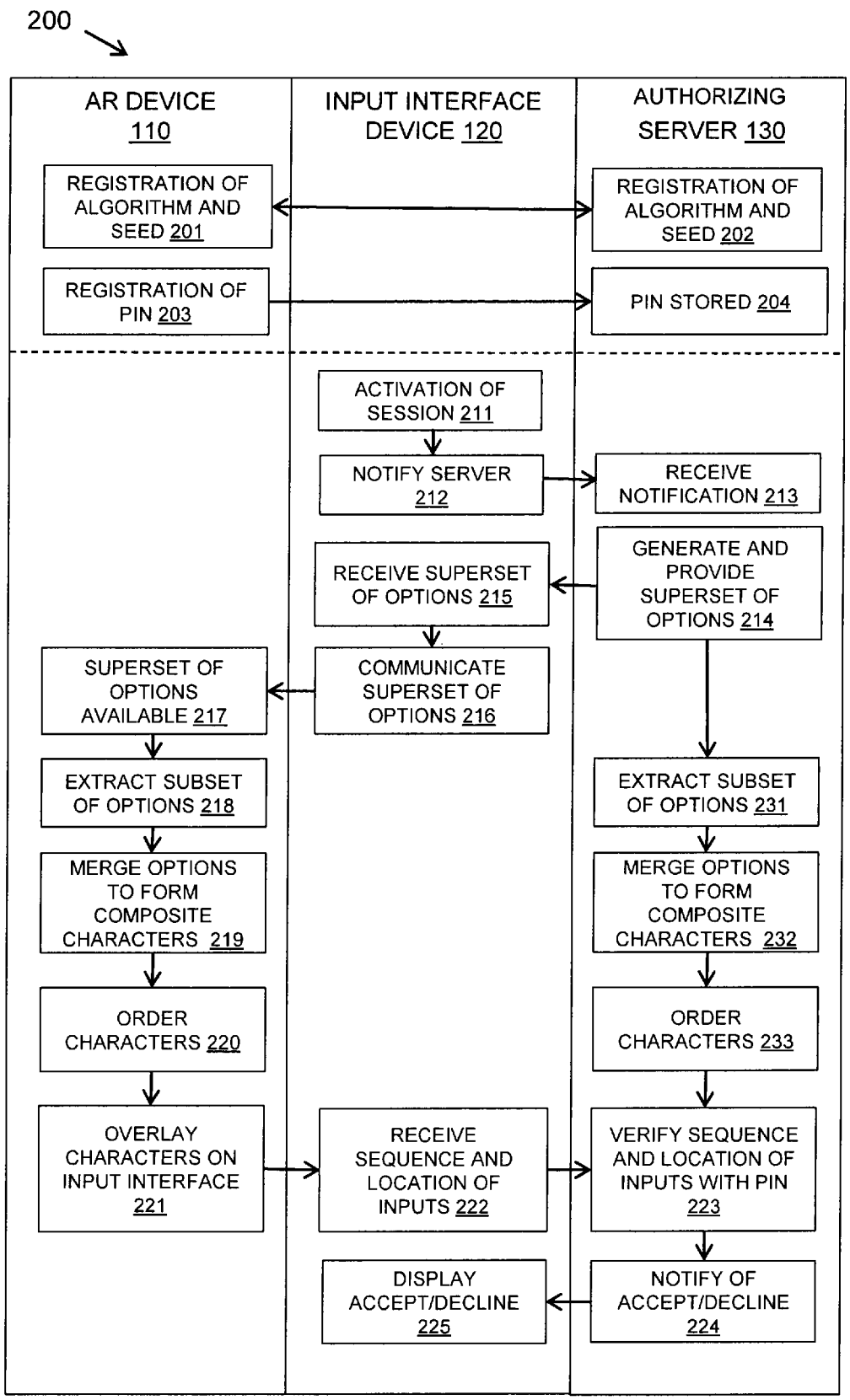
FIG. 2 is a swim-lane flow diagram of an example embodiment of a method in accordance with an aspect of the present invention.

Referring to FIG. 2, a swim-lane flow diagram 200 shows an example embodiment of the described method operating at a user's AR device 110, an input interface device 120 and an authorizing server 130.

A registration procedure is carried out between a user of the AR device 110 and the authorizing server 130 in which an algorithm with a unique seed is agreed 201, 202 between the AR device 110 and the server 130. The algorithm may be static or dynamic for each authorization of the user of the AR device 110 at the server 130. The passcode or PIN is also registered 203 with the server 130 and stored 204 with reference to the user at the server 130.

At the time of a transaction, the user or a merchant may activate 211 a session at the input interface device 120 including an identifier of the AR device 110 or user. This activation may be by various methods. For example, in an ATM scenario a user may insert their payment card into an ATM. Similarly, at a POS device, a payment card may be inserted. However, in other scenarios, a card may not be present and a session may be activated for a cardless transaction, for example, using a mobile or digital wallet.

The authorizing server 130 may be notified 212, 213 by the input interface device 120 of the activation of a session together with a reference to the AR device 110 or user in order for the authorizing server 130 to access the registered algorithm and seed for the user and the stored passcode or PIN.

This notification 212, 213 may include details of the input interface of the input interface device, in particular a number of input options. This is because a user may input his passcode or PIN into different forms of input interface which have different display capabilities. For example, a standard keypad may only have 10 input options for numerical digits, whereas a touch screen display may be capable of accommodating many more input options which may be used for alphanumeric inputs.

The authorizing server 130 may generate and provide 214 a superset of options to the input interface device 120. The input interface device 120 may receive 215 the superset of options and may communicate 216 the superset of options to the AR device 110.

In one embodiment, a wireless communication channel may be used to communicate the superset of options to the AR device 110. If a wireless communication channel is used, the communication channel may be discontinued after the communication of the superset of options. Even if this data stream is intercepted, it would not be possible to generate the correct options without knowledge of the registered algorithm and seed.

In another embodiment, this may be by displaying the superset of options on a display of the input interface device 120 which means that no wireless communication is required between the AR device 110 and the input interface device 120. The superset of options may be displayed within a designated area. The displayed items do not relate to human readable items, but may be simple markers or QR (Quick Response) codes that may be easily parsed and related to 'options'. Using simple QR codes, it is possible to reliably extract this information. Even though these options would be visible to a third party, it would not be possible to generate the correct filtered and compound options without knowledge of the registered algorithm and seed.

Once the superset of options is available 217 to the AR device 110, it extracts 218 the subset, optionally performs a merging or combining 219 of the subset or mapping of the subset, to create a final set of options, which are ordered or placed 220 in reference, via the AR capability, to the input interface device 120.

In one embodiment, the AR device 110 performs these steps in the following way:

Based on the total number of provided options, extract a subset. The subset is extracted 218 in a pseudo-random order, determined by the initial registration. The more options that are available, the greater the resulting subset size.

Based upon the subset size, a merging 219 is performed as a pseudo-random merging of subset items based on the initial registration. The merging is pseudo-random in that more than two options may be merged, not all options are merged and merging does not progress as a linear traversal of all options (i.e. do not simply "skip a few").

This final subset is pseudo-randomly ordered 220, and within it, contains elements that comprise the user PIN or passcode (if alphanumeric values are enabled). Additionally, it is possible to generate a variable number of final options that may be presented to the user in order to perform the authorization.

These final options are overlaid 221 on the input interface device 120, whereby the user may select the entries that correspond to their passcode or PIN at the input interface device 120. Upon passcode or PIN input, the sequence and location of the inputs are received 222 by the input interface device 120. The display at the input interface may be blank or may have random digits displayed, so the sequence and location of the inputs made is determined and sent to the authorization server 130. The authorization server 130 verifies 223 the sequence and location of the inputs with the sequence and location of the registered PIN or passcode as it would be applied to a corresponding composite character order generated 233 at the authorization server 130.

The verification is performed at the authorization server 130 by the authorization server 130 carrying out steps 231-233 which correspond to steps 218-220 to determine the inputs entered at the input interface device 120.

The authorization server 130 may notify 224 the input interface device 120 of an acceptance or decline of the passcode or PIN which notification may be displayed 225 at the input interface device 120.

On physical PIN entry systems such as keypads, the number of options that may be generated are limited, but will benefit from a pseudo-random ordering of the overlay.

On next-generation, or online, PIN entry systems, the user may be presented with an enhanced range of options directly related to the available "real estate" available to place selections. In this instance it is possible to use the presented system to present a larger number of options in a pseudo-random order. This is an innate ability of the filtering and pairing algorithm.

Figure 3:
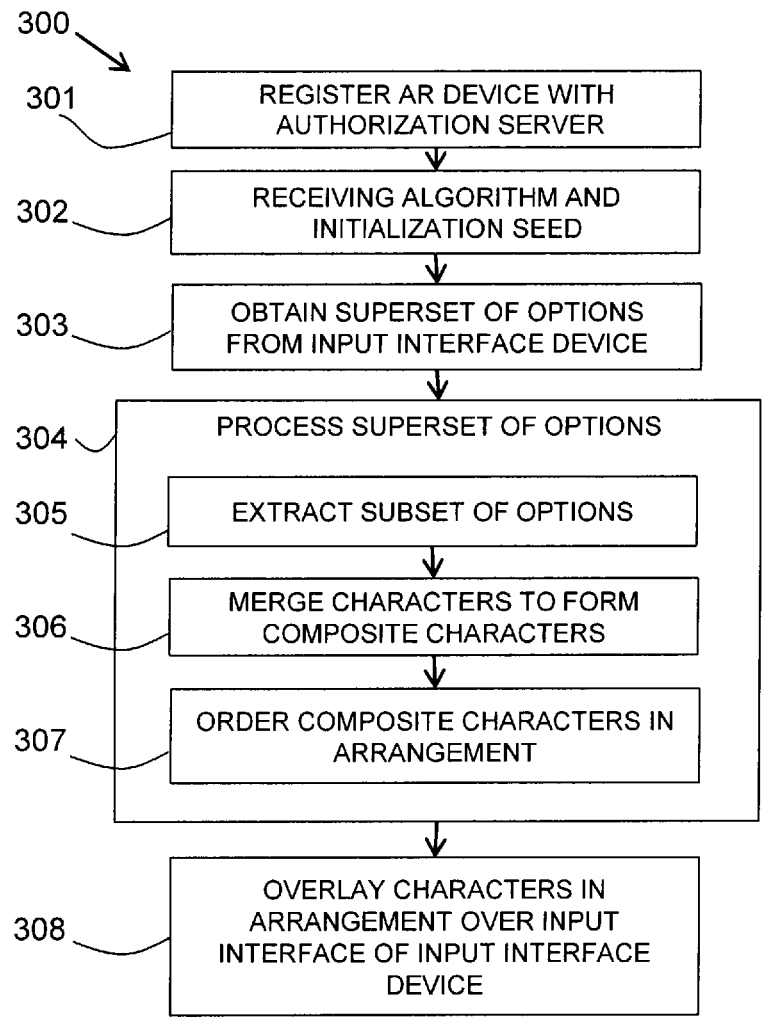
FIG. 3 is a flow diagram of an example embodiment of an aspect of a method in accordance with an aspect of the present invention.

Referring to FIG. 3, a flow diagram 300 shows an aspect of the described method as performed at an AR device 110.

An AR device 110 is registered 301 at an authorization server 130 for a user 101 and the registration includes the AR device 110 receiving or having specified 302 an algorithm and initialization seed.

When a user wishes to activate a session with an input interface device 120, the AR device 110 obtains 303 a superset of options from the input interface device 120. This may be obtained via a wireless network link to the input interface device 120 or by the AR device 110 capturing a superset of options displayed at the input interface device 120 using a camera or scanner or the AR device 110.

The AR device 110 may also obtain details of the input interface arrangement of the input interface device 120 in order to determine the required arrangement for presentation of its overlay.

The superset of options may then be processed 304 according to the specified algorithm and initialization seed and including the following steps. The processing may be carried out without any communication with the input interface device 120 or the authorization server 130.

The steps of the processing 304 may vary and in this embodiment include: extracting or filtering 305 a subset of options from the superset of options; merging 306 characters corresponding to the subset of options to form a set of composite characters, wherein the set of composite characters includes the characters of a registered user passcode; and ordering 307 the composite characters in an arrangement for presentation to a user.

The AR device 110 may then overlay 308 the arrangement of characters using the augmented reality capability of the AR device in relation to an input interface of the input interface device 120.

Figure 4:
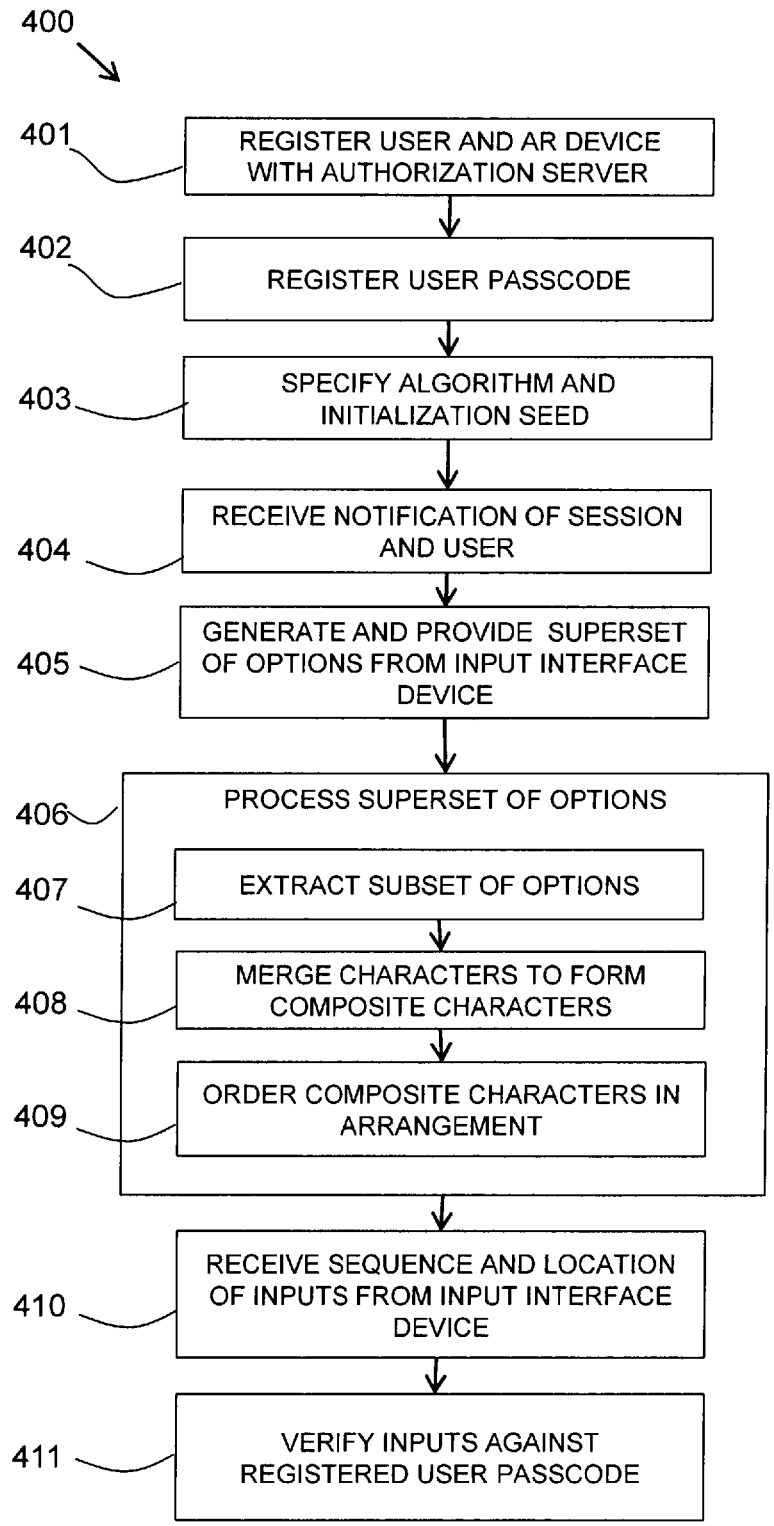
FIG. 4 is a flow diagram of an example embodiment of another aspect of a method in accordance with an aspect of the present invention.

Referring to FIG. 4, a flow diagram 400 shows an aspect of the described method as performed at an authorization server 130.

A user 101 and AR device 110 are registered 401 at the authorization server 130 including registering 402 a passcode for the user 101 and specifying 403 an algorithm and initialization seed for the AR device 110.

When a user 101 wishes to activate a session with an input interface device 120, the authorization server 130 receives notification 404 of a new session and the identity of the registered user. The notification may also include details of the input interface arrangement of the input interface device 120 in order to determine the required arrangement for input of a passcode.

The authorization server 130 may generate and provide 405 a superset of options to the input interface device 120.

The superset of options may then be processed 406 according to the specified algorithm and initialization seed and including the following steps. The processing corresponds to the processing carried out at the AR device 110.

The steps of the processing 406 in one embodiment may include: extracting or filtering 407 a subset of options from the superset of options; merging 408 characters corresponding to the subset of options to form a set of composite characters, wherein the set of composite characters includes the characters of a registered user passcode; and ordering 409 the final characters in an arrangement.

The authorization server 130 may receive 410 a sequence and location of inputs as received by the input interface device 120 in relation to the input interface arrangement of the input interface device 120.

The received sequence and location of inputs are verified 411 against the known registered passcode of the user at the authorization server 130.

The described method provides the availability of more options than a traditional keypad may be capable of showing. For instance, a 'traditional' keypad for PIN entry may provide 10 keys for a user to input their numeric PIN, the described method proposes the supply of the device far in excess of this number (e.g., 1000). These provided options are filtered based upon a pairing that has been performed on a one-off instance within a secure environment.

The filtered options are still in excess of that supported by the input interface device. This filtered subset of options are super-imposed to provide a final set of compound options; this superposition may also be based upon an algorithm initialized at the initial pairing. Once all super-impositions are complete, the resulting set is suitable to use for PIN authorization. This final subset still contains items that are not part of the final user PIN. The ability of alphanumeric items to be used as a PIN is availed. The ability to generate a variable number of user options, based upon the entry system being used, is availed.

Only the AR device and the authorization server know the pairing and hence the unique filter required to extract the subset and form the final compound keys. With the provision of so many possible options, and variations on the combination between these options, the possible compound combinations available are 'many'. Only the human knows the actual "final" PIN that is required for authorization once the compound set has been created and can be selected from the final subset of compound options.

A variable security level may be provided that can automatically scale based upon the input device being used. For example, the screen resolution of an ATM is not very high and therefore there is a limited scope to display codes. However, a high resolution screen of a PC may enable the display of a large number of entities or options due to the pixels available. Additionally, the activity being carried out may dictate the level of security required. For example, accessing emails requires a lower level of security and therefore a smaller number of options shown compared to logging into a bank account which requires a high level of security and therefore a large number of options.

Figure 5A:
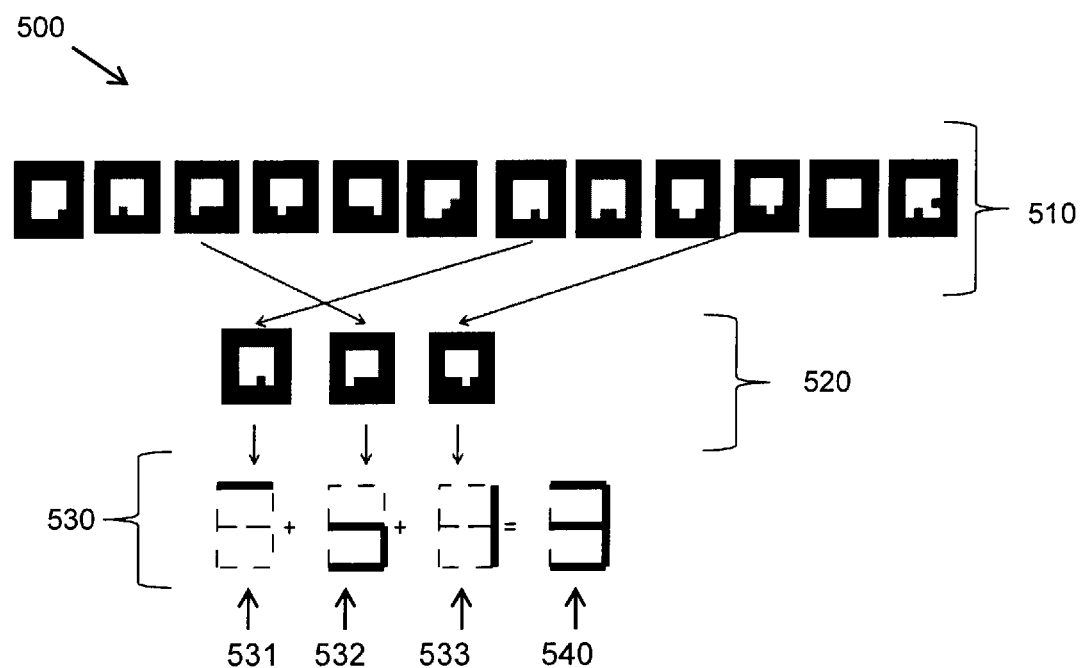
FIGS. 5A-5C are schematic diagrams of example embodiments of option processing in accordance with an aspect of the present invention.
Figure 5B:
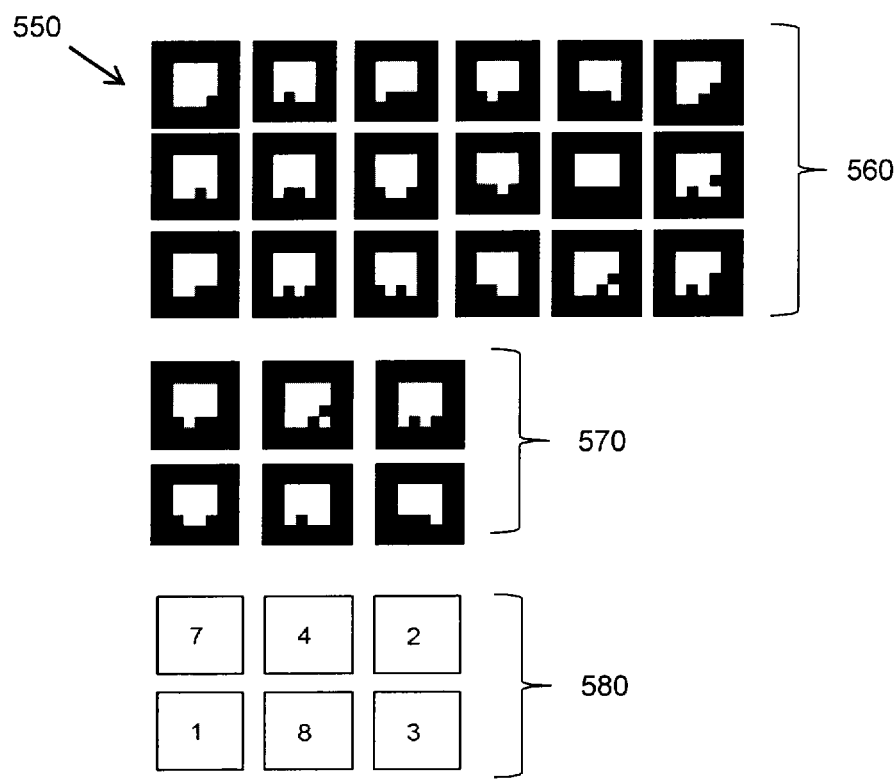

Referring to FIGS. 5A and 5B, schematic diagrams 500, 550 illustrate two embodiments as examples of the processing of the provided superset of options obtained from the input interface device. As it will be appreciated, there are many different variations on how this may be carried out. The described processing may be carried out at the AR device 110 using the registered algorithm and seed value. A corresponding processing may be carried out at the authorization server 130 using the registered algorithm and seed value.

In these two embodiments, the superset of options is provided as a set of markers or codes 510, 560 as shown in FIGS. 5A and 5B. Other forms of icons or graphical representations may be used. The superset of options 510 may be provided by the authorization device 130 and communicated by the input interface device 120 to the AR device 110 and hence the user 101. In this embodiment, the superset of options 510 are shown as markers in the form of 4×4 block arrays which are not human readable and therefore may be displayed by the input interface device 120.

In the first embodiment shown in FIG. 5A, each marker 510 represents a component of part of a character in the form of a digital number or letter. There may be a one to one mapping of a marker to a component. The form of the components is described further in relation to FIG. 5C.

A subset 520 is selected by the pseudo-random process and the markers of the subset 520 are mapped to components 530, 531, 532, 533 of a digital number or letter shape. The mapped component 531, 532, 533 are then merged or combined to result in a final character 540 for display.

The steps may be repeated to extract a total number of final characters 540 which results in the complete set of integer or letter characters. The characters 540 are then pseudo-randomly ordered for display and input using the AR overlay. The characters of the user's PIN or passcode will be within the displayed characters.

Figure 5C:
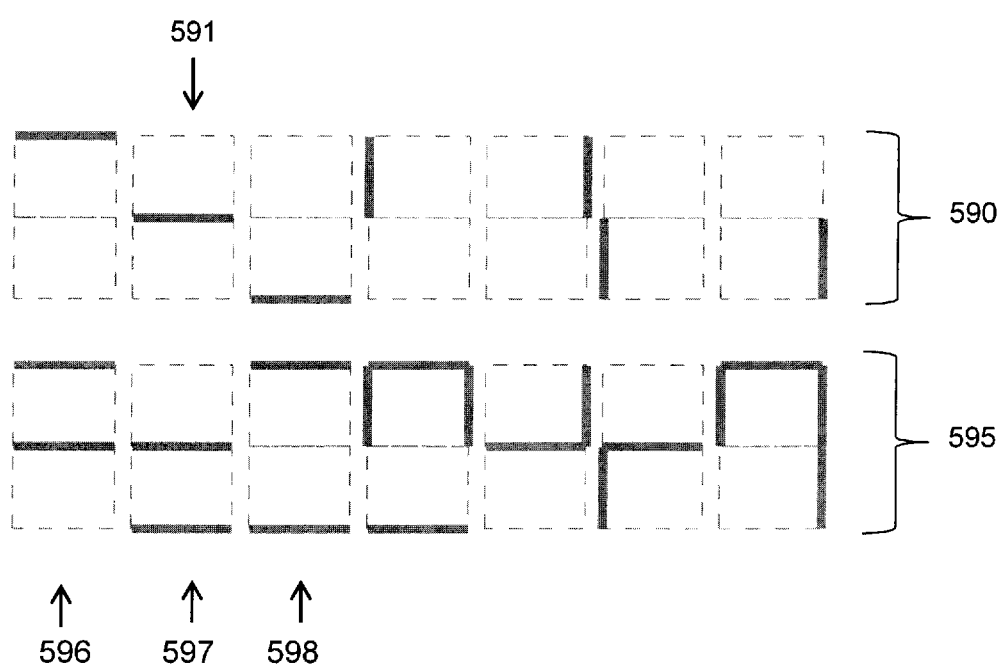

FIG. 5C shows some possible examples of the components 530 of a digital number or letter shaped. Single edge components 590 of a digital number or letter shape may be used. Optionally, partial edges may be used to increase the number of components. There may also be compound components 595 of more than one edge or partial edge. The compound components 595 shown in FIG. 5C are a small example set of the possible compound components.

Additional permutations can be obtained by applying rules to the combination or merging of the components. For example, repeated components may cancel out. An example of this is the first two compound components 596 and 597 would merge to result in the third compound component 598, since the central horizontal component cancels out. This component may be added from component 591 of the single components to result in three horizontal bars that constitute part of the integer 8.

In the second embodiment shown in FIG. 5B, markers 550 may be superimposed themselves to result in a final marker which may identify a unique artifact such as a numeric or letter character 580. Depending on the resolution available and if superimposing rules are also applied such as "remove repeated locations", the permutations available are very great.

In the second embodiment, there may be a one to one mapping of markers to complete characters (integers or letters). A pseudo-random set 570 may be extracted from a superset 560 of markers. The ordering of the extracted set 570 is known. The extracted set may be overlaid on an input device and the user may see the characters 580 being overlaid on the input device due to the AR capability. The user may then interact with the input device to select the character of his PIN or passcode.

Figure 6:
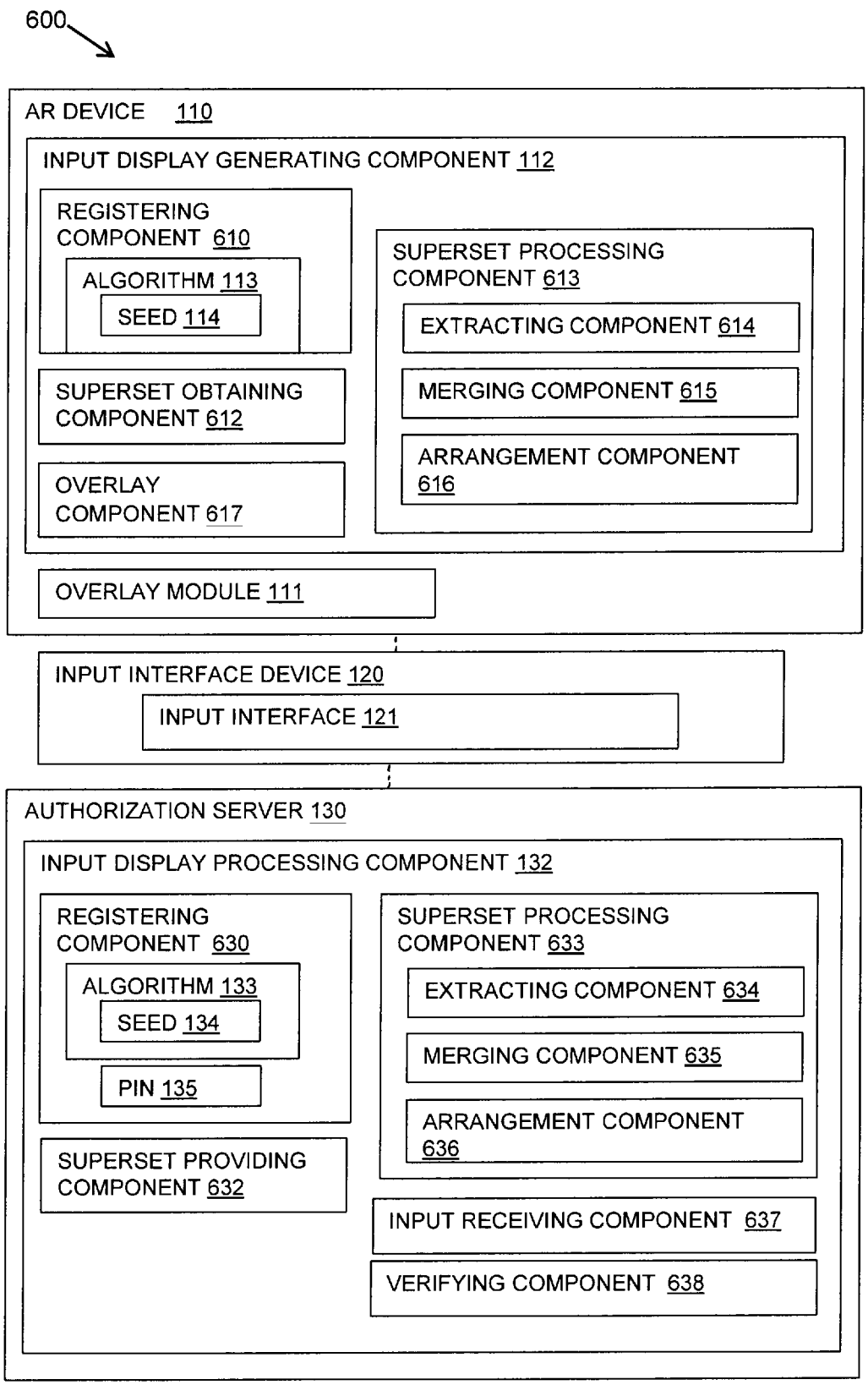
FIG. 6 is block diagram of an example embodiment of a system in accordance with an aspect of the present invention.

Referring to FIG. 6, a block diagram shows an example embodiment of the described system 600 including an AR device 110, an input interface device 120, and an authorization server 130.

An AR device 110 is provided as described in relation to FIG. 1 including an input display generating component 112. The input display generating component 112 may include a registering component 610 for registering the AR device 110 with an authorization server 130 and obtaining and storing an algorithm 113 and initialization seed 114 for use by a superset processing component 613.

The input display generating component 112 may include a superset obtaining component 612 for obtaining a superset of options for input from an input interface device 120. The superset processing component 613 may include an extracting component 614, an optional merging component 615, and an arrangement component 616 for carrying out the functionality as described in relation to FIGS. 2 and 3.

A superset processing component 613 may process the obtained superset of options to obtain an overlay of input options in an arrangement to be provided by an overlay component 617 and applied by an overlay module 111 of an AR capability of the AR device 110.

An authorization server 130 is provided as described in relation to FIG. 1 including an input display processing component 132. The input display processing component 132 may include a registering component 630 for registering the user 101 and AR device 110 and specifying an algorithm 133 and initialization seed 134 for use by a superset processing component 633 at the authorization server 130. The registering component 630 may also register a passcode or PIN 135 for the user.

The input display generating component 132 of the authorization server 130 may include a superset providing component 632 for generating and providing a superset of options for input at an input interface device 120.

A superset processing component 633 may process the generated superset of options in a manner corresponding to the superset processing component 613 of the AR device 110 to obtain an arrangement of input options. The superset processing component 633 may include an extracting component 634, an optional merging component 635 and an arrangement component 636 for carrying out the functionality as described in relation to FIGS. 2 and 4.

The input display processing component 132 may include an input receiving component 637 for receiving a sequence and location of inputs received at the input interface device 110 and a verifying component 638 for verifying the inputs against the registered passcode or PIN 135.

Figure 7:
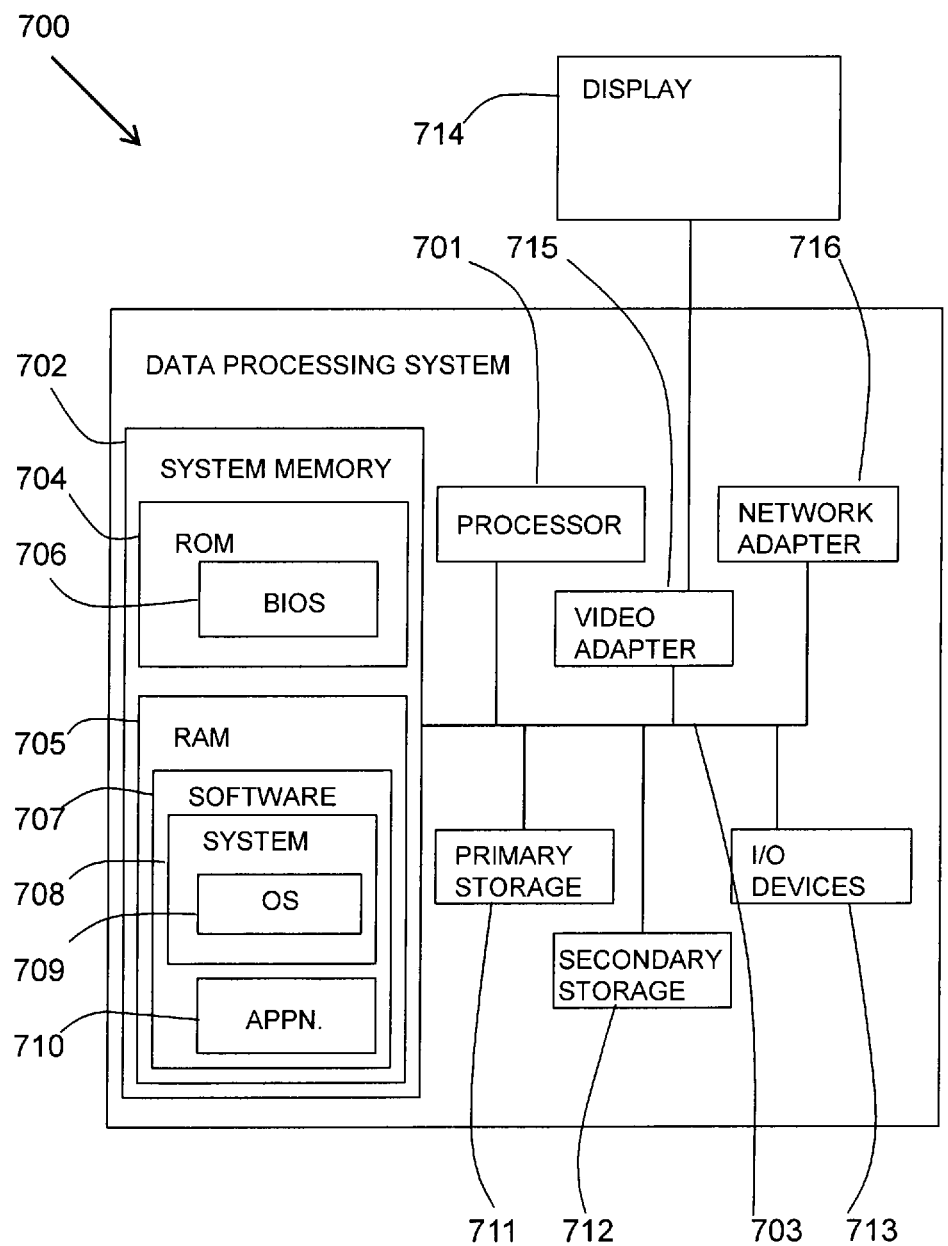
FIG. 7 is a block diagram of an embodiment of a computer system in which an aspect of the present invention may be implemented.

Referring to FIG. 7, an example system for implementing aspects of the invention such as the authorization server includes a data processing system 700 suitable for storing and/or executing program code including at least one processor 701 coupled directly or indirectly to memory elements through a bus system 703. The memory elements may include local memory employed during actual execution of the program code, bulk storage, and cache memories which provide temporary storage of at least some program code in order to reduce the number of times code is to be retrieved from bulk storage during execution.

The memory elements may include system memory 702 in the form of read only memory (ROM) 704 and random access memory (RAM) 705. A basic input/output system (BIOS) 706 may be stored in ROM 704. Software 707 may be stored in RAM 705 including system software 708 such as operating system software 709. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

Figure 8:
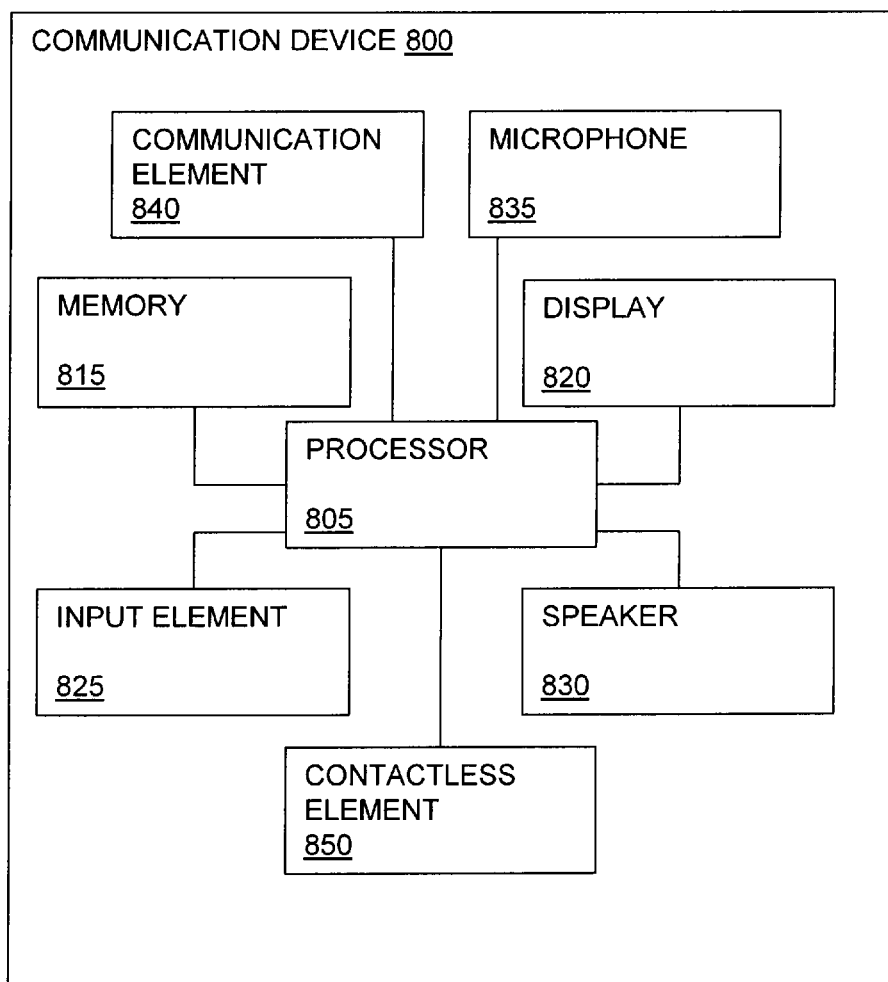
FIG. 8 is a block diagram of an embodiment of a communication device in which an aspect of the present invention may be implemented.

FIG. 8 shows a block diagram of a communication device 800 that may be used in embodiments of the disclosure, for example as an AR device or as an input interface device. The communication device 800 may be a cell phone, a feature phone, a smart phone, a satellite phone, or a computing device having a phone capability, including a wearable device such as glasses, watches, etc.

The communication device 800 may include a processor 805 (e.g., a microprocessor) for processing the functions of the communication device 800 and a display 820 to allow a user to see the phone numbers and other information and messages. The communication device 800 may further include an input element 825 to allow a user to input information into the device (e.g., input buttons, touch screen, etc.), a speaker 830 to allow the user to hear voice communication, music, etc., and a microphone 835 to allow the user to transmit his or her voice through the communication device 800.

The processor 805 of the communication device 800 may connect to a memory 815. The memory 815 may be in the form of a computer-readable medium that stores data and, optionally, computer-executable instructions.

The communication device 800 may also include a communication element 840 for connection to communication channels (e.g., a cellular telephone network, data transmission network, Wi-Fi network, satellite-phone network, Internet network, Satellite Internet Network, etc.). The communication element 840 may include an associated wireless transfer element, such as an antenna.

The communication element 840 may include a subscriber identity module (SIM) in the form of an integrated circuit that stores an international mobile subscriber identity and the related key used to identify and authenticate a subscriber using the communication device 800. One or more subscriber identity modules may be removable from the communication device 800 or embedded in the communication device 800.

The communication device 800 may further include a contactless element 850, which is typically implemented in the form of a semiconductor chip (or other data storage element) with an associated wireless transfer element, such as an antenna. The contactless element 850 may be associated with (e.g., embedded within) the communication device 800 and data or control instructions transmitted via a cellular network may be applied to the contactless element 850 by means of a contactless element interface (not shown). The contactless element interface may function to permit the exchange of data and/or control instructions between mobile device circuitry (and hence the cellular network) and the contactless element 850.

The contactless element 850 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 800 and an interrogation device. Thus, the communication device 800 may be capable of communicating and transferring data and/or control instructions via both a cellular network and near field communications capability.

The data stored in the memory 815 may include: operation data relating to the operation of the communication device 800, personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device 800 to selected receivers.

The communication device 800 may be, amongst other things, a notification device that can receive alert messages and access reports, a portable merchant device that can be used to transmit control data identifying a discount to be applied, as well as a portable consumer device that can be used to make payments.

Aspects of the described method and system provide convenience and less friction for the user. The user does not have to provide or wield a touchscreen or cursor mechanism personal to them; the shared input device can be mounted in a convenient place. This provides benefits for mobility impaired people, as well as speeding up the process which would be especially valuable in high throughput areas such as ticket machines/ticket barriers and ATMs. It would also be more intuitive for young or inexperienced users. The described method also has advantages for wearable devices such AR glasses where direct input to the glasses is difficult.

Aspects of the described method and system also provide protection. With the system, the user is to be physically at the device to pair. This means all users in range have the ability to pair, but the user physically there has priority by their physical presence. Once they have paired, the pairing is confirmed until they either complete the interaction or cancel. In prior art systems, another user in the area could cause a denial of service by either jumping in first and pairing with the device from a distance, or "steal" the pairing after the legitimate user has paired. For the described system, a person would have to physically barge in to use the input device, which would be obvious to everyone. Although this would not necessarily cause any loss of information if there was a following authentication step, it would be inconvenient and amount to a denial of service attack.

Aspects of the described method and system enable prevention of unsolicited connections. To pair, for example, with a user's phone, someone would have to physically press something on it. Just seeing it would not be enough. This would prevent bluejacking style attacks if a phone is left visible in a public place. The person would have to physically interact with the phone to pair with it.

As described herein, according to one aspect of the present invention, there is provided a method for secure passcode entry using a mobile device having augmented reality capability, comprising: registering the mobile device with an authorization server to register an agreed input display algorithm with an initialization seed and wherein a user passcode is registered with the authorization server; obtaining a superset of options from an input interface device at which a user passcode is to be entered; processing the superset of options using the input display algorithm and initialization seed to result in an arrangement of characters including the characters of a registered user passcode; and overlaying the arrangement of characters using the augmented reality capability of the mobile device in relation to an input interface of the input interface device.

In one embodiment, the processing of the superset of options may include: extracting a subset of options from the superset of options; merging characters corresponding to the subset of options to form a set of composite characters, wherein the set of composite characters includes the characters of a registered user passcode; and ordering the composite characters in an arrangement for presentation to a user.

In another embodiment, the processing of the superset of options may include: extracting a subset of options from the superset of options, wherein an option corresponds to a character and wherein the subset includes the characters of a registered user passcode; and ordering the characters in an arrangement for presentation to a user.

Obtaining a superset of options from the input interface device may be by communication over a wireless communication network. Alternatively, obtaining a superset of options from the input interface device may be by display of the superset of options at the input interface device.

Processing the superset of options using the input display algorithm and initialization seed may be carried out offline from the input interface device.

The obtaining a superset of options, processing the superset of options, and overlaying the arrangement of composite characters may be carried out for each new transaction with an input interface device.

Obtaining a superset of options may obtain a different superset of options for each new transaction with an input interface device.

The input display algorithm may be a dynamic algorithm and/or an initialization seed which changes with each new transaction with an input interface device.

The method may also include obtaining details of the input interface arrangement of the input interface device in order to determine the required arrangement for presentation of the composite characters.

The characters may be in the form of numerical or alphanumerical characters. In some embodiments, the characters may be digital characters formed of line components.

According to another aspect of the present invention, there is provided a system for secure passcode entry comprising a mobile device having augmented reality capability, wherein the mobile device comprises: a registering component for registering the mobile device with an authorization server to register an agreed input display algorithm with an initialization seed and wherein a user passcode is registered with the authorization server; a superset obtaining component for obtaining a superset of options from an input interface device at which a user passcode is to be entered; a superset processing component for processing the superset of options using the input display algorithm and initialization seed to result in an arrangement of characters including the characters of a registered user passcode; and an overlay component for overlaying the arrangement of characters using the augmented reality capability of the mobile device in relation to an input interface of the input interface device.

In one embodiment, the superset processing component may include: an extracting component for extracting a subset of options from the superset of options; a merging component for merging characters corresponding to the subset of options to form a set of composite characters, wherein the set of composite characters includes the characters of a registered user passcode; and an arrangement component for ordering the composite characters in an arrangement for presentation to a user.

In another embodiment, the superset processing component may include: an extracting component for extracting a subset of options from the superset of options wherein an option corresponds to a character and wherein the subset includes the characters of a registered user passcode; and an arrangement component for ordering the characters in an arrangement for presentation to a user.

The superset obtaining component for obtaining a superset of options from the input interface device may use a wireless communication network. Alternatively, the superset obtaining component for obtaining a superset of options from the input interface device may include a display reading component for reading a display of the superset of options at the input interface device.

The superset processing component for processing the superset of options using the input display algorithm and initialization seed may be carried out offline from the input interface device.

According to a further aspect of the present invention, there is provided a computer program stored on a computer readable medium and loadable into the internal memory of a digital computer, comprising software code portions, when said program is run on a computer, for performing the method of one aspect of the invention.

According to yet a further aspect of the present invention, there is provided a method for verifying a secure passcode entry carried out at an authorization server, wherein the secure passcode entry uses a mobile device having augmented reality capability, comprising: registering a user with a user passcode; registering a mobile device of a user to register an agreed input display algorithm with an initialization seed; receiving notification of a new session for a registered user; generating and providing a superset of options to an input interface device at which a user passcode is to be entered; processing the superset of options using the input display algorithm and initialization seed to result in an arrangement of characters including the characters of a registered user passcode; receiving a sequence and location of inputs from the input interface device as input by the user; and verifying the received sequence and location of inputs with the arrangement of characters as it would be presented to a user.

Generating and providing a superset of options may obtain a different superset of options for each new transaction with an input interface device.

The input display algorithm may be a dynamic algorithm and/or initialization seed which changes with each new transaction with an input interface device.

The method may also include receiving details of the input interface arrangement of the input interface device in order to determine the required arrangement for presentation of the composite characters.

According to a another aspect of the present invention, there is provided a system for verifying a secure passcode entry including an authorization server, wherein the secure passcode entry uses a mobile device having augmented reality capability, the authorization server comprising: a registering component for registering a user with a user passcode and registering a mobile device of a user to register an agreed input display algorithm with an initialization seed; a session activation component for receiving notification of a new session for a registered user; a superset providing component for generating and providing a superset of options to an input interface device at which a user passcode is to be entered; a superset processing component for processing the superset of options using the input display algorithm and initialization seed to result in an arrangement of characters including the characters of a registered user passcode; an input receiving component for receiving a sequence and location of inputs from the input interface device as input by the user; and a verifying component for verifying the received sequence and location of inputs with the arrangement of characters as it would be presented to a user.

According to a yet further aspect of the present invention, there is provided a computer program stored on a computer readable medium and loadable into the internal memory of a digital computer, comprising software code portions, when said program is run on a computer, for performing the method of the further aspect of the invention.

According to an even further aspect of the present invention, there is provided a method substantially as described with reference to the figures.

According to a further aspect of the present invention, there is provided a system substantially as described with reference to the figures.

The described aspects of the invention enable secure passcode entry with or without a wireless data transfer communication during the passcode entry.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A computer-implemented method, comprising:
registering a mobile device with an authorization server to register an agreed input display algorithm with an initialization seed and wherein a user passcode is registered with the authorization server;
obtaining, from the authorization server, a superset of options from an input interface device at which the user passcode is to be entered;
processing, by the mobile device without communicating with the authorization server, the superset of options using the input display algorithm and initialization seed to result in an arrangement of characters including characters of the registered user passcode, wherein processing the superset of options comprises merging characters extracted from the superset of options to form a set of composite characters comprising the registered user passcode;
overlaying the composite characters using the augmented reality capability of the mobile device in relation to an input interface of the input interface device; and
accessing transactions, from the mobile device, accessible via communication with the authorization server, based on the authorization server verifying the registered user passcode obtained via entry in the overlaid input interface.

2. The computer-implemented method as claimed in claim 1, wherein overlaying the composite characters further comprises: ordering the composite characters in an arrangement for presentation to a user.

3. The computer-implemented method as claimed in claim 1, wherein the characters extracted from the superset of options comprise a subset of options, and wherein an option corresponds to a character.

4. The computer-implemented method as claimed in claim 1, wherein the obtaining the superset of options from the input interface device is by communication over a wireless communication network.

5. The computer-implemented method as claimed in claim 1, wherein the obtaining the superset of options from the input interface device is by display of the superset of options at the input interface device.

6. The computer-implemented method as claimed in claim 1, wherein the processing the superset of options using the input display algorithm and initialization seed is carried out offline from the input interface device.

7. The computer-implemented method as claimed in claim 1, wherein obtaining the superset of options, the processing the superset of options, and the overlaying the arrangement of characters are carried out for each new transaction with an input interface device.

8. The computer-implemented method as claimed in claim 1, wherein obtaining a superset of options obtains a different superset of options for each new transaction with an input interface device.

9. The computer-implemented method as claimed in claim 1, wherein at least one of: the input display algorithm is a dynamic algorithm or the initialization seed changes with each new transaction with the input interface device.

10. The computer-implemented method as claimed in claim 1, further comprising obtaining details of the input interface of the input interface device in order to determine a required arrangement for presentation of the composite characters.

11. The computer-implemented method as claimed in claim 1, wherein the characters are in the form of numerical or alphanumerical characters.

12. A computer system, comprising:
a memory; and
a processing device in communication with the memory, wherein the computer system is configured to perform a method, said method comprising:
registering a mobile device with an authorization server to register an agreed input display algorithm with an initialization seed and wherein a user passcode is registered with the authorization server;
obtaining, from the authorization server, a superset of options from an input interface device at which the user passcode is to be entered;
processing, by the mobile device without communicating with the authorization server, the superset of options using the input display algorithm and initialization seed to result in an arrangement of characters including characters of the registered user passcode, wherein processing the superset of options comprises merging characters extracted from the superset of options to form a set of composite characters comprising the registered user passcode;

overlaying the composite characters using the augmented reality capability of the mobile device in relation to an input interface of the input interface device; and accessing transactions, from the mobile device, accessible via communication with the authorization server, based on the authorization server verifying the registered user passcode obtained via entry in the overlaid input interface.

13. The computer system of claim 12, wherein overlaying the composite characters further comprises: ordering the composite characters in an arrangement for presentation to a user.

14. The computer system of claim 12, wherein the characters extracted from the superset of options comprise a subset of options, and wherein an option corresponds to a character.

15. The computer system of claim 12, wherein obtaining the superset of options from the input interface is accomplished utilizing a method selected from the group consisting of: communication over a wireless communication network and display of the superset of options at the input interface device.

16. A computer program product, comprising:

a computer readable storage medium readable by a processing circuit and storing instructions for execution by the processing circuit for performing a method comprising:

registering a mobile device with an authorization server to register an agreed input display algorithm with an initialization seed and wherein a user passcode is registered with the authorization server;

obtaining, from the authorization server, a superset of options from an input interface device at which the user passcode is to be entered;

processing, by the mobile device without communicating with the authorization server, the superset of options using the input display algorithm and initialization seed to result in an arrangement of characters including characters of the registered user passcode, wherein processing the superset of options comprises merging characters extracted from the superset of options to form a set of composite characters comprising the registered user passcode;

overlaying the composite characters using the augmented reality capability of the mobile device in relation to an input interface of the input interface device; and accessing transactions, from the mobile device, accessible via communication with the authorization server, based on the authorization server verifying the registered user passcode obtained via entry in the overlaid input interface.

17. The computer program product of claim 16, wherein overlaying the composite characters further comprises: ordering the composite characters in an arrangement for presentation to a user.

18. The computer program product of claim 16, wherein the characters extracted from the superset of options comprise a subset of options, and wherein an option corresponds to a character.

19. The computer program product of claim 16, wherein obtaining the superset of options from the input interface is accomplished utilizing a method selected from the group consisting of: communication over a wireless communication network and display of the superset of options at the input interface device.

20. The computer program product of claim 16, wherein at least one of: the input display algorithm is a dynamic algorithm or the initialization seed changes with each new transaction with the input interface device.

* * * * *